H. F. SMITH.
LAMP.
APPLICATION FILED JUNE 24, 1909.
Reissued Nov. 2, 1909. 13,033.
2 SHEETS—SHEET 1.
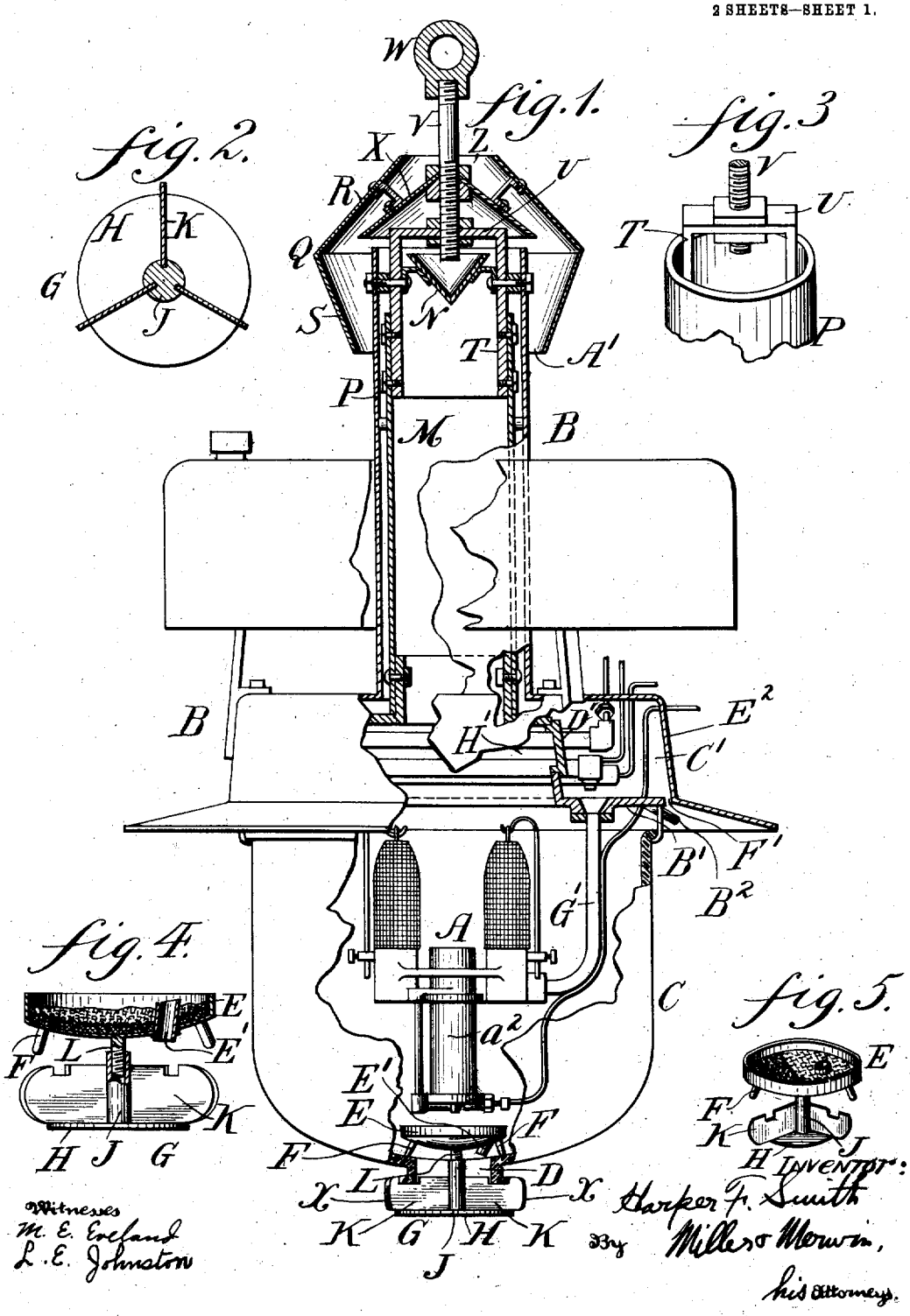

H. F. SMITH.

LAMP.

APPLICATION FILED JUNE 24, 1909.

Reissued Nov. 2, 1909. 13,033.

2 SHEETS—SHEET 2.

Witnesses
M. E. Eveland
L. E. Johnston

Inventor:
Harper F. Smith
By Miller & Merwin,
his Attorneys

UNITED STATES PATENT OFFICE.

HARPER F. SMITH, OF PHILADELPHIA, PENNSYLVANIA, ASSIGNOR TO SMITH INCANDESCENT LIGHT COMPANY, A CORPORATION OF NEW JERSEY.

LAMP.

13,033. Specification of Reissued Letters Patent. Reissued Nov. 2, 1909.

Original No. 759,037, dated May 3, 1904, Serial No. 172,704. Application for reissue filed June 24, 1909. Serial No. 504,200.

*To all whom it may concern:*

Be it known that I, HARPER F. SMITH, a citizen of the United States, residing at Philadelphia, in the county of Philadelphia and State of Pennsylvania, have invented a new and useful Improvement in Lamps, of which the following is a specification.

My invention consists of a novel construction of a lamp, having for its object to provide means to regulate the supply of air to the bottom of the lamp in an effective and novel manner and also to prevent improper and injurious drafts from entering the hot-air chamber from the top of the lamp.

It further consists of a novel ignition-cup.

It further consists of means for providing a supply of fresh air above the lamp-globe.

It further consists of features of construction hereinafter fully described and claimed.

Figure 6:
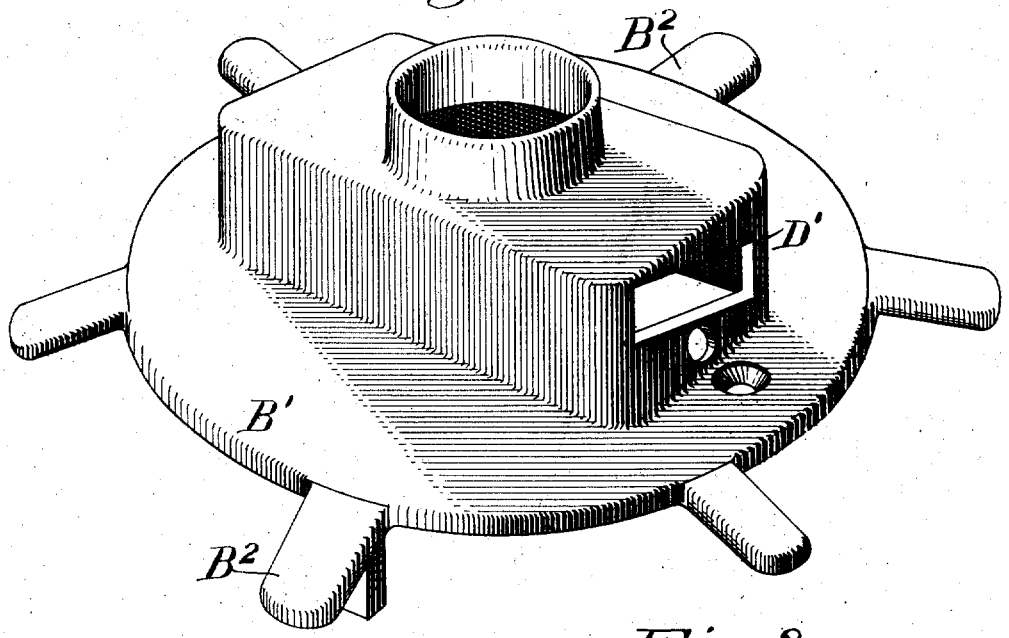
Figure 8:
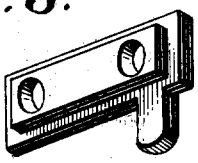
Figure 7:
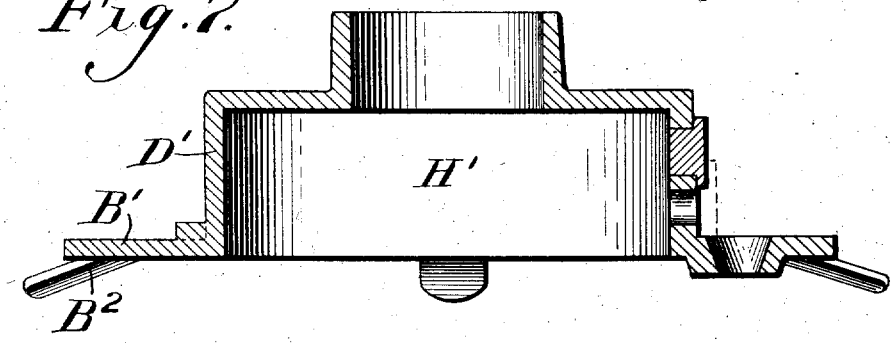

Figure 1 represents a partial central vertical section and partial elevation of a lamp constructed in accordance with my invention. Fig. 2 represents a transverse section taken on the line *xx* of Fig. 1. Fig. 3 represents a perspective view of an upper detached portion of a lamp, showing the supporting device therefor. Fig. 4 represents a partial vertical section and partial elevation of a lower portion of my lamp detached. Fig. 5 represents in perspective the same portion. Figs. 6 and 7 represent in perspective and vertical section, respectively, the heating-chamber of my device detached. Fig. 8 represents the closure for said chamber.

For the purpose of illustrating my invention I have shown my lamp adapted specially for burning a hydrocarbon vapor; but as my invention relates to the construction of the means for controlling a supply of air and preventing injurious draft and for lighting the lamp the features of construction relating to that burner proper are not illustrated in detail nor will be described, as this application is a division of my application for a vapor-burner, filed April 20, 1903, Serial No. 154,970.

Similar letters of reference indicate corresponding parts in the figures.

Referring to the drawings, A designates the burner proper, having an axially-disposed preheating or starting device $a^2$, and B the frame of the lamp, which is rigidly secured by bolts both to a suspension-eye and to an annular plate B′, constituting the base of a fresh-air chamber hereinafter described. Said lamp is provided with a globe C, which is suitably supported by depending clamping fingers $C^2$ rigidly secured to said base B′ and has an opening D in its lower portion. Above this opening and beneath the starting device $a^2$ is located a cup E, which rests upon the feet F.

G designates a deflecting device composed of a base portion H, an upright stem J, and vertical blades K, the office of said deflecting device being to deflect air up into the globe C, which air plays a dual part—first, as a fresh-air supply for burner consumption, and, second, to equalize any back pressure that might occur within the apparatus.

It will be understood that the inner deflector or cup E and the outer deflector G, are held in engagement by a threaded stem L; but as the connection or union of these two parts may be accomplished by various other means I do not deem it necessary to describe this construction in detail.

As shown, the disk or cup E is of greater diameter than the opening D of the lamp-globe, so that any air entering thereat is deflected toward the sides of the globe C; said disk or deflecting means, as shown, is of sufficient extent to initially project substantially all of said entering currents as a unitary cooling envelop, of sufficient size to envelop the central mantle zone, into the zone intermediate the sides of the globe and said central zone or zone of maximum temperature. In this way the glass is kept cool and the mantles protected from air-currents.

Within the cup E is a layer of asbestos fiber or other absorbent material, shown as held in place by a disk of wire-gauze or the like. A short tube E′ passes up through the bottom of the cup E. When the lamp is to be lighted, a portion of the hydrocarbon is permitted to overflow into the cup E, is absorbed by the fibrous material therein, and immediately vaporizes. The flame from a match held below the ignition-tube E′ lights this vapor, so that the lamp may be started without a torch and without the tedious waiting usually necessary.

The products of combustion from the burner A pass upwardly and into the hot-air cylinder M and impinge against the inverted cone N, whereby the products of combustion are deflected over the top of the outer case or weather-cylinder P against the walls of the weather-hood Q, which latter is composed of the angularly-disposed upper and lower cone frusta R and S, united at their bases. The upper portion of the hot-air cylinder M has secured thereto the inverted-U or other shaped brace T, whose top portion U is secured to the threaded stem V, having an eye W thereon, whereby the lamp may be conveniently supported. In the present instance I have shown the inverted cone N as supported from the brace T, and I have shown the cone X as supported from the stem V, while the weather-hood Q is supported from said cone X.

It will thus be understood from the foregoing that the inverted cone N uniformly directs the products of combustion around and out of the hot-air cylinder M. The hood Q is provided with an opening Z at its top and an annular opening A′ at its bottom, which latter surrounds the outside or weather cylinder P. It will also be seen that the angle formed by the junction of the inclined sides R and S cuts the air and deflects the same either upwardly or downwardly, so that there can be no improper or injurious drafts within the hot-air cylinder, since said air must pass above the top of the opening Z and below the bottom of the opening A′, it being also apparent that the cone X by reason of its location below the upper opening Z also assists to prevent any improper or injurious drafts in the hot-air chamber. It will also be apparent by reason of my novel construction that if the lamp should be suspended close to a wall where the air would be deflected downwardly upon the hood Q any air passing into the upper opening Z would flow over the cone X and out at the bottom opening A′

When a wind of considerable force is blowing, a portion of the annular lower opening will be shielded by the cylinder P, so that the opening Z will be able to carry off the products of combustion, as well as all the air driven into the hood at A′. If the wind is deflected downward into the opening Z, it would be prevented by the cone X from passing down the cylinder N and will pass out at the leeward side of the opening A′ without interfering with combustion.

The admission of fresh-air into the interior of the burners and into the annular passage intermediate the hot-air cylinder M and the weather-hood P, is afforded by a so-called fresh-air chamber C′. This chamber comprises the annular space intermediate the crown of the casing or hood $E^2$ and the wall D′ surrounding a hot-air chamber, which wall is integral with the aforesaid plate B′. Said plate B′ has an exterior diameter somewhat less than the interior diameter of the casing $E^2$, thus affording an annular opening F′ for the direct admission of the air from the exterior of the globe C, and is provided with off-set ears $B^3$, adapted to support said casing $E^2$. It is evident that a portion of the air entering through said opening will pass down the mixing-tube G′ to the burners A, the remainder passing upwardly through the fresh-air chambers C′ and thence into the annular space between the hot-air cylinder M and the weather-hood cylinder P, the latter annular space serving to effect the necessary draft. The wall D′ surrounds the hot-air chamber H′ which is located, as shown, immediately above the burners A and is in direct communication with the hot-air cylinder M. From the construction shown, it is evident that the cylinder M will serve to heat the air passing through the annular space intermediate the same and the surrounding cylinder B and will augment the draft through the said passage. This will be materially increased by the radiant heat moreover from the wall D′ of the hot-air chamber H′, and thereby the necessary draft will be effected, thus inducing the entrance of large quantities of air into the hot-air chamber and thence supplying the necessary air to the burners via the tube G′, as well as a sufficient supply to cool the outer portions of the lamp.

It is clear that the heated cylinder M will cause a strong upward draft in the surrounding cylinder P. This will be assisted by the radiant heat from the wall D′ of the hot-air chamber H′. By these means an ample supply of fresh air is secured both for the mixing-tube G′ and for cooling the outer portions of the lamp.

It will be seen that two upward currents are created and discharged into the hood Q. One of these enters the inlet at the bottom of the globe and passes therethrough and through the hot-air chamber H′ and the inner cylinder M. The other enters through the annular opening F′ and except the portion which is used to mix with the vapor of the lamp passes through the chamber C′ and the annular space within the cylinder P.

It is evident that by properly proportioning the area of these two inlets and the outlet of the hood Q any desired draft and volume of air both for combustion and to prevent overheating may be obtained. It is also evident that various changes may be made by those skilled in the art which will come within the scope of my invention, and I do not therefore, desire to be limited in every instance to the exact construction herein shown and described.

Having thus described my invention, what I claim as new, and desire to secure by Letters Patent, is:—

1. In a lamp, the combination of an apertured globe, and a deflecting device consisting of a cup, means for supporting said cup within said globe, a disk, means depending from said cup for suspending the disk below the globe and a series of vertical blades intermediate said disk and globe.

2. In a lamp, the combination of an apertured globe, and a deflecting device consisting of a cup, means for supporting said cup, a disk, a series of vertical blades intermediate said disk and globe and means common to said blades and disk, depending from said cup, for suspending said disk and the blades below said globe.

3. In a lamp, the combination of an apertured globe, and a deflecting device consisting of a cup, means for supporting said cup, a disk, means depending from said cup for suspending said disk below the globe, a series of vertical blades intermediate said disk and globe, and a hot-air cylinder above said disk, said blades directing the air from below the globe upwardly against said cup, which latter uniformly distributes the same within said cup and directs it upwardly through the hot-air cylinder.

4. In a lamp, the combination of a globe having a bottom aperture, and a deflecting device within said globe and of a diameter greater than that of said aperture, means for supporting said deflecting device within said globe, a disk, means depending from said deflecting device for suspending said disk below the globe and a series of vertical blades intermediate said disk and globe.

5. In a lamp, the combination of a globe provided with a bottom aperture, and a deflecting device, means for supporting said deflecting device within said globe, a disk, means depending from said deflecting device for suspending said disk below the globe, said deflecting device and said disk each being of a diameter greater than that of said bottom aperture, and a series of vertical blades intermediate said disk and globe.

6. In a lamp, the combination of a globe provided with a bottom aperture and a deflecting device consisting of a cup, means for supporting said cup within said globe and adjacent said aperture, and means for affording the access of a flame to the interior of said cup for igniting fluid contained therein.

7. In a lamp, the combination of a globe provided with a bottom aperture, and a deflecting device consisting of a cup of a diameter greater than that of said aperture and having an ignition-tube extending therethrough, means for supporting said cup, a disk, means depending from said cup for suspending said disk below the globe, and a series of vertical blades intermediate said disk and globe.

8. In a lamp, the combination of an apertured globe, a burner, a starting device comprising a cup provided with an ignition-tube extending therethrough, means for supporting said cup within said globe and beneath said burner, a disk, means depending from said cup for suspending said disk below the globe, and a series of vertical blades intermediate said disk and globe.

9. In a lamp, the combination comprising a hot-air cylinder for carrying off the products of combustion, an inverted conical deflector adjacent to the top of said cylinder, a cap above said cylinder, a weather-hood open at its upper and lower ends and surrounding the top of said cylinder and said cap, means for connecting said deflector, cap and hood with said hot-air cylinder.

10. In a lamp, a hot-air cylinder, a weather-casing annularly spaced away from said cylinder, a brace secured to the upper end of said cylinder, an inverted conical deflector adjacent to the top of said cylinder, a cap covering said cylinder and a weather-hood having top and bottom openings surrounding said cap and the upper end of said cylinder.

11. In a lamp, a hot-air cylinder for carrying off the products of combustion, an inverted conical deflector adjacent the upper end of said cylinder, a hood including the upper end of said cylinder and consisting of two cone frusta united at their bases, and a conical cap within and separated from said hood of a diameter greater than that of the top of said cylinder, and means for connecting said deflector, hood and cap with said hot-air cylinder.

12. In a lamp, a hot-air cylinder for carrying off the products of combustion, an inverted conical deflector adjacent the top of said cylinder, an inverted cap above, and of substantially greater diameter than, said cylinder, a weather-hood open at its upper and lower ends surrounding the upper end of said cylinder and said cap, the greatest diameter of said hood being substantially in the plane of the exit-opening beneath said cap, and means for connecting said deflector, hood and cap with said hot-air cylinder.

13. In a lamp, a hot-air cylinder, a weather-casing surrounding said hot-air cylinder, an inverted conical deflector adjacent the top of said hot-air cylinder, a cap covering said deflector, said cylinder and said casing, a weather-hood open at its upper and lower ends surrounding the upper ends of said cylinder, said casing and said cap, and means for connecting said deflector, hood and cap with said hot-air cylinder.

14. In a lamp, a hot-air cylinder, a weather-casing surrounding said hot-air cylinder, an inverted conical deflector adjacent the top of said hot-air cylinder, a cap covering said deflector, said cylinder and said casing, a weather-hood consisting of two cone frusta, united at their bases, surrounding the upper ends of said cylinder said casing and said cap, and means for connecting said deflector, hood and cap with said hot-air cylinder.

15. In a lamp, the combination comprising a casing forming a hot-air chamber, a burner, means depending from said casing for suspending said burner from said casing, a hot-air cylinder connected with said hot-air chamber and in communication therewith, a second casing surrounding said aforesaid casing and forming a fresh-air chamber, a second cylinder integral with the casing of said fresh-air chamber and in communication with said fresh-air chamber, said cylinder being concentrically disposed around the hot-air cylinder and means for the admission of air to both of said chambers.

16. In a lamp, the combination comprising a casing forming a hot-air chamber, a burner, means depending from said casing for suspending the burner from said casing, a hot-air cylinder connected with said hot-air chamber and in communication therewith, a second casing surrounding the aforesaid casing and forming a fresh-air chamber, a second cylinder integral with the casing of said fresh-air chamber and in communication with said fresh-air chamber, and an annular plate of less diameter than the outer wall of said fresh air chamber and forming the base thereof, whereby an annular opening is provided for the admission of air to said fresh-air chamber.

17. In a lamp, the combination comprising a casing forming a hot-air chamber, a burner, means depending from said casing for suspending said burner from said casing, a hot-air cylinder connected with said hot-air chamber and in communication therewith, a second casing surrounding the aforesaid casing and forming a fresh-air chamber, a second cylinder integral with the casing of said fresh-air chamber and in communication with said fresh-air chamber, said cylinder being concentrically disposed around the hot-air cylinder, means for the admission of air to both of said chambers, and a mixing-tube connected with said burner for conveying air from said fresh-air chamber to said burner.

18. In a lamp, the combination comprising a casing forming a hot-air chamber, a burner, means depending from said casing for suspending said burner from said casing, a hot-air cylinder connected with said hot-air chamber and in communication therewith, a second casing surrounding the aforesaid casing and forming a fresh-air chamber, a second cylinder integral with the casing of said fresh-air chamber and in communication with said fresh-air chamber, and a mixing-tube connected with said burner for conveying air from said fresh-air chamber to said burner.

19. In a lamp, the combination comprising a casing forming a hot-air chamber, a burner, means depending from said casing for suspending said burner from said casing, a hot-air cylinder connected with said hot-air chamber and in communication therewith, a second casing surrounding the aforesaid casing and forming a fresh-air chamber, a second cylinder integral with the casing of said fresh air chamber and in communication with said fresh-air chamber, and a hood surrounding and extending above the upper end of both of said cylinders and secured thereto.

20. In a lamp, the combination comprising a casing forming a hot-air chamber, a burner, means depending from said casing for suspending said burner from said casing, a hot-air cylinder connected with said hot-air chamber and in communication therewith, a second casing surrounding the aforesaid casing and forming a fresh-air chamber, a second cylinder integral with the casing of said fresh-air chamber and in communication with said fresh-air chamber, and a lamp supporting device secured to the upper end of said cylinders.

21. In a lamp, the combination comprising a casing forming a hot-air chamber, a burner, means depending from said casing for suspending said burner from said casing, a hot-air cylinder connected with said hot-air chamber and in communication therewith, a second casing surrounding the aforesaid casing and forming a fresh-air chamber, a second cylinder integral with the casing of said fresh-air chamber and in communication with said fresh-air chamber, and an annular plate forming the base of said fresh-air chamber and of less diameter than the outer casing thereof, and means for the admission of air to both of said chambers.

22. In a lamp, in combination with a globe provided with a bottom aperture, and a plurality of burner elements provided with mantles disposed therein, means exterior of said opening for directing lateral air-currents upwardly therethrough, and means for laterally deflecting such entering currents so as to substantially prevent the uninterrupted ascent of the same into the zone intermediate the respective mantles of the burner elements, whereby the sides of said globe are maintained relatively cool, the mantles are protected from air-currents, and fresh air for burner consumption is supplied.

23. In a lamp, in combination with a globe provided with a bottom aperture, and a plurality of burner elements provided with mantles disposed therein, means exterior of said opening for directing lateral air-currents upwardly therethrough and means within said globe for laterally deflecting such entering currents, said deflecting means being of sufficient extent to initially project substantially all of said entering currents as a unitary cooling envelop into the zone intermediate the sides of the globe and the central zone intermediate the said mantles, said envelop being sufficiently large to envelop the zone intermediate the said mantles, whereby the sides of said globe are maintained relatively cool, the mantles are protected from air-currents, and fresh air for burner consumption is supplied.

24. In a lamp, in combination with a globe provided with a bottom aperture, a plurality of burner elements provided with mantles disposed therein, means exterior of said opening for directing lateral air-currents upwardly therethrough and for laterally deflecting substantially all of said upwardly directed air-currents toward the sides of said globe, said deflecting means being of sufficient extent to prevent the uninterrupted rectilineal ascent of substantially all of said air-currents into the zone intermediate the aforesaid mantles, whereby the sides of said globe are maintained relatively cool, the mantles are protected from air-currents, and fresh air for burner consumption is supplied.

25. In a lamp the combination of a globe provided with a bottom aperture, a burner provided with a mantle disposed therein, a deflecting device including a plurality of radially extending blades, means for suspending said deflecting device below said globe, and means for laterally deflecting air currents entering through said aperture so as to substantially prevent the uninterrupted ascent of the same into the central zone of the globe in which said mantle is positioned, whereby the sides of said globe are maintained relatively cool, the mantle is protected from air-currents, and fresh air for burner consumption is supplied.

26. In a lamp, the combination with a globe provided with a bottom aperture, a burner element, provided with a mantle, positioned therein, means exterior of said opening for directing lateral air-currents upwardly therethrough, and means for laterally deflecting such entering air-currents so as to substantially prevent the uninterrupted ascent of the same into the central zone of said globe containing said burner element, whereby the sides of said globe are maintained relatively cool, the mantle of said burner element is protected from air-currents, and fresh air for burner consumption is supplied.

27. In a lamp, the combination with a globe provided with a bottom aperture, a burner element, provided with a mantle, disposed therein, means exterior of said opening for directing lateral air-currents upwardly therethrough, and means within said globe for laterally deflecting such entering currents, said deflecting means being of sufficient extent to initially project substantially all of said entering currents as a unitary cooling envelop into the zone intermediate the sides of the globe and the central zone of the globe containing said mantle, and said envelop being sufficiently large to envelop the central zone of the globe, whereby the sides of the globe are maintained relatively cool, the mantle is protected from air currents, and fresh air for burner consumption is supplied.

28. In a lamp, the combination with a globe provided with a bottom aperture, a burner element, provided with a mantle, disposed therein, means exterior of said aperture for directing lateral air-currents upwardly therethrough and for laterally deflecting substantially all of said upwardly directed air-currents toward the sides of said globe, said deflecting means being of sufficient extent to prevent the uninterrupted rectilineal ascent of substantially all of said air-currents into the zone containing the aforesaid mantle, whereby the sides of said globe are maintained relatively cool, the mantles are protected from air-currents, and fresh air for burner consumption is supplied.

29. In a lamp, the combination with a globe provided with a bottom aperture, a plurality of burner elements, provided with mantles, disposed therein, a deflecting device, means for suspending said deflecting device below said globe, a series of radially extending blades intermediate said deflecting device and globe, and means for laterally deflecting air-currents entering through said aperture so as to substantially prevent the uninterrupted ascent of the same into the zone intermediate the respective mantles of the burner elements whereby the sides of said globe are maintained relatively cool, the mantles are protected from air-currents and fresh air for burner consumption is supplied.

30. In a lamp, the combination with a globe having a bottom aperture and a plurality of burner elements, provided with mantles, disposed therein, a plurality of radially extending blades arranged beneath said aperture and suspended from said globe, means for laterally deflecting substantially all of the air-currents entering into the globe through said opening so as to prevent the uninterrupted rectilineal passage of the same into the zone intermediate the said mantles, and means beneath said blades for preventing the direct ascent of air-currents into said globe, whereby the sides of said globe are maintained relatively cool, the mantles are protected from air-currents, and fresh air for burner consumption is supplied.

31. In a lamp, the combination comprising a burner element, a casing forming a hot-air chamber supported above said burner, a hot-air cylinder in communication with said hot-air chamber and connected with the casing thereof, a second casing surrounding the casing of said hot-air chamber and forming a fresh-air chamber external of said hot-air chamber, means for supporting the latter casing and a base for said fresh-air chamber integral with the casing forming the hot-air chamber.

HARPER F. SMITH.

Witnesses:
FREDK. C. EBERHARDT,
BESSIE M. CHADWICK.